United States Patent [19]

Kobori

[11] Patent Number: 5,624,980
[45] Date of Patent: Apr. 29, 1997

[54] THERMOPLASTIC CEMENT COMPOSITION AND PROCESS FOR THE PREPARATION OF MOLDED ARTICLE THEREOF

[75] Inventor: Shigeji Kobori, Saitama, Japan

[73] Assignees: Tobuchemicals, Inc., Saitama; Mitsui & Co., Ltd., Tokyo, both of Japan

[21] Appl. No.: 325,356

[22] PCT Filed: Jun. 16, 1994

[86] PCT No.: PCT/JP94/00976

§ 371 Date: Mar. 24, 1995

§ 102(e) Date: Mar. 24, 1995

[87] PCT Pub. No.: WO95/00456

PCT Pub. Date: Jan. 5, 1995

[30] Foreign Application Priority Data

Jun. 21, 1993 [JP] Japan .................................. 5-149136

[51] Int. Cl.$^6$ ........................... C08K 3/00; C08K 3/34
[52] U.S. Cl. ........................ 524/5; 524/8; 524/448
[58] Field of Search ............................ 524/5, 8, 448

[56] References Cited

U.S. PATENT DOCUMENTS

| | | | |
|---|---|---|---|
| 3,043,790 | 7/1962 | Sanders | 524/8 |
| 3,634,293 | 1/1972 | Bonitz | 524/8 |
| 4,614,755 | 9/1986 | Rodgers | 524/5 |
| 4,746,365 | 5/1988 | Babcock et al. | 106/104 |
| 4,842,650 | 6/1989 | Blounts | 106/90 |

*Primary Examiner*—Peter A. Szekely
*Attorney, Agent, or Firm*—Flynn, Thiel, Boutell & Tanis, P.C.

[57] ABSTRACT

The present invention provides a thermoplastic cement composition, characterized in that the composition can be easily processed thermoplastically during molding and that when the cement component constituting the composition is hardened by the absorption of water, the composition loses its thermoplasticity to give a product having excellent heat resistance and other properties.

The thermoplastic cement composition comprises 100 parts by weight of a thermoplastic, 50 to 600 parts by weight of a hydraulic cement and/or an air-hardening cement and 0.1 to 20 parts by weight of a hydrophilic substance.

9 Claims, No Drawings

THERMOPLASTIC CEMENT COMPOSITION AND PROCESS FOR THE PREPARATION OF MOLDED ARTICLE THEREOF

FIELD OF THE INVENTION

The present invention relates to a thermoplastic cement composition having intermediate properties between those of cements and those of thermoplastics, and provides a thermoplastic cement composition which is usable in a wide industrial field including articles which need heat resistance.

RELATED ART

It has been known to modify a thermoplastic by the addition of an inorganic filler.

However, it has also been known that the heat resistance of a thermoplastic cannot essentially be improved by this means. Further, although the thermoplasticity of a thermoplastic is a property indispensable to molding, it is unnecessary in many cases after molding. A liquid-crystal plastic developed for the main purpose of providing a highly heat-resistant resin is molded at a high temperature. If a plastic which can be molded at a low temperature and is highly resistant to heat is prepared, however, the value thereof will be very large.

Although a thermosetting resin is known to be relatively excellent in heat resistance, this resin is inferior to a thermoplastic in the rate and ease of molding and does not compare with a thermoplastic as a whole, though a thermosetting resin is regarded as of high value by virtue of its in-situ moldability.

Recently, the disposal of waste plastics has become an environmental issue. However, no suitable method for the disposal thereof has been found as yet, so that the development of a new effective method therefor has been expected. Generally, a thermoplastic is lowered in moldability and properties after the first heat cycle, which makes the recycle of a thermoplastic so difficult as to give a large amount of waste plastics.

Although the conversion of waste plastics into an oil through thermal cracking has recently been noted as a technique for recycling waste plastics, this technique has problems that this oil is more costly than ordinary fuel oils, that the sorting of waste plastics is necessary, and that the cracking residue must be secondarily disposed of. Under these circumstances, it has been expected to develop a technique for recycling waste plastics which uses a waste plastic itself as the raw material and can be applied to a waste plastic contaminated with other plastics and/or foreign matters.

Meanwhile, precast concrete has problems that the molding cost is high and that the curing takes a long time, so that concrete is far inferior to thermoplastic in molding cost. It is conceivable that these problems will be solved, if precast concrete can be produced thermoplastically, but no thermoplastically moldable concrete has been put on the market as yet.

As described above, it has been a practice in the prior art to add an inorganic filler to a thermoplastic for the purpose of weight gain, improvement in heat or pressure resistance, and so forth. However, mere addition of a hydraulic or air-hardening cement to a thermoplastic fails in modifying the thermoplastic.

This is because mere addition of a cement to a thermoplastic causes the cement to be enveloped in the thermoplastic and prevented from undergoing hydration or air hardening, so that the cement functions only as a filler. In such a case, a thermoplastic is not improved in heat resistance at all and deteriorates in moldability, because the filler added serves only to lower the melt index.

DISCLOSURE OF INVENTION

The inventors of the present invention have applied the technique of polymer alloys to the preparation of a blend of a thermoplastic with a cement component and have found that the use of a substance which can impart hydrophilicity to a thermoplastic resin so as to permit the hydration of a cement component contained therein brings about success in developing a plastic cement composition which can easily be processed thermoplastically in molding and loses its thermoplasticity when the cement component absorbs water to harden. The present invention has been accomplished on the basis of this finding.

Namely, the present invention relates to a thermoplastic cement composition comprising 100 parts by weight of a thermoplastic, 50 to 600 parts by weight of a hydraulic cement and/or an air-hardening cement and 0.1 to 20 parts by weight of a hydrophilic substance; and a process for producing a molded cement article which comprises adding 0.1 to 20 parts by weight of a hydrophilic substance to 100 parts by weight of a thermoplastic to effect compatibilization, adding 50 to 600 parts by weight of a hydraulic cement and/or an air-hardening cement to the obtained mixture, kneading the resulting mixture, and hardening the mixture by adding water thereto.

In the present invention, the hardening of a cement component mixed with a thermoplastic is also possible by preliminarily adding a hydrophilic substance to a cement component to conduct the surface treatment of the cement component therewith, but the above-mentioned polymer alloy method is more effective.

The constitution of the present invention will now be described in detail.

The thermoplastic to be used in the present invention includes all thermoplastics except thermosetting resins.

Examples of the thermoplastic include asphalt, polyethylene (PE), polypropylene (PP), polyvinyl chloride, ethylene-vinyl acetate copolymer (EVA), acrylonitrile-butadiene-styrene copolymer (ABS), acrylonitrile-acrylic rubber-styrene copolymer (AAS), acrylonitrile-EPDM-styrene copolymer (AES), acrylonitrile-chlorinated polyethylene-styrene copolymer (ACS), methyl methacrylate-butadiene-styrene copolymer (MBS), E-PVC, polyvinylidene chloride, chlorinated olefin-butadiene resin, polyacetal, nylon, polyethylene terephthalate (PET), polycarbonate (PC), polystyrene (PS), polymethyl methacrylate (PMMA), thermoplastic polyurethane (TPU), polybutylene terephthalate (PBT), polyphenylene ether (PPE), polyarylate (PAR), liquid-crystal polymer (LCP), polytetrafluoroethylene (PTFE), polyether ketone (PEK), polyether ether ketone (PEEK), polyether sulfone (PES), styrenic thermoplastic elastomer, olefinic thermoplastic elastomer, polyester elastomer, polyamide elastomer, polybutadiene elastomer, vinyl chloride elastomer, and other rubbers such as natural rubber, styrene-butadiene rubber (SBR), butadiene rubber (BR), isoprene rubber (IR), chloroprene rubber.(CR), acrylonitrile-butadiene rubber (NBR), ethylenepropylene rubber (EPM) and isobutyleneisoprene rubber (IIR), which may be used also as a mixture or copolymer of two or more of them, and may be any of fresh and waste ones.

Hereinafter, such a thermoplastic is referred to as "the thermoplastic resin".

The hydraulic cement to be used in the present invention includes not only portland cements, such as normal portland cement, blast-furnace cement, fly ash cement and white cement, but also other hydraulic cements, such as super-high-early strength cement of the Hauyen type, alumina cement, dental cement, oxychloride cement, acid-proof cement and gypsum, and further mixtures of two or more components which react with water to form a hydraulic cement, such as a mixture of activated silica with calcium hydroxide and one of activated alumina with calcium hydroxide.

On the other hand, the air-hardening cement to be used in the present invention includes lime, magnesia cement, substances which harden with air through carbonation, such as calcium hydroxide and dolomite plaster, and powdered metals which harden through oxidation, such as powdered iron and powdered zinc.

The above hardening component such as a hydraulic or air-hardening cement reacts with at most a stoichiometrical amount of water or air in the thermoplastic resin to harden. Thus, the hydration of the cement component according to the present invention is different from that of portland cement attained under the conventional service conditions. Accordingly, the product of the hardening according to the present invention has properties similar to those of a polymer cement.

Hereinafter, such a cement is referred to as "the cement component".

The hydrophilic substance to be used in the present invention is a substance which can impart hydrophilicity to the above thermoplastic resin, more precisely, a substance which can be dispersed or dissolved in the thermoplastic resin by the technique of polymer alloys to impart such water wettability and air permeability to the thermoplastic resin as to permit the hardening of a hydraulic or air-hardening cement contained in the resin.

Examples of the substance having such an effect include polyolefin oxides, such as polyethylene oxide and polypropylene oxide, polyhydric alcohols, such as polyvinyl alcohol (PVA), polyethylene glycol and polypropylene glycol, mixtures of two or more of them, and copolymers thereof, polypropylene glycol (PPG) derivatives, for example those containing polyurethane prepolymer, such as nonionic surfactants among surfactants, polyoxyethylene alkyl ethers as starting material therefor, polyoxyethylene alkyl ethers of polyhydric alcohol, polyethylene glycol/fatty acid esters, and esters of polyhydric alcohols.

Alternatively, a highly water-absorbing polymer may be added to the thermoplastic resin by powder mixing. However, this means has a small disadvantage, because the water absorbing power of a highly water-absorbing polymer is remarkably lowered to result in a poor effect when the polymer is mixed directly with the thermoplastic resin. Therefore, it is preferable to employ a method of synthesizing a highly water-absorbing polymer in the thermoplastic resin to thereby overcome the above disadvantage. More precisely, a highly water-absorbing polymer is generally incompatible with the thermoplastic resin and is insoluble in an organic solvent and fails to modify the surface of the thermoplastic resin. According to the above method of conducting the synthesis of a highly water-absorbing polymer in the resin, a modifier equivalent to polyolefin oxide can be prepared by adding either of the raw materials of the synthesis to the thermoplastic resin by powder mixing, while adding the other thereof to the resin directly or in a state dissolved in a compatibilizing agent.

Examples of the highly water-absorbing polymer to be used include starch derivatives, such as starch-acrylonitrile graft polymer, starch-acrylic acid graft polymer, starch-styrenesulfonic acid graft polymer, starch-vinylsulfonic acid graft polymer, starch-acrylamide graft polymer, starch-polyvinyl ketone graft polymer, cellulose-acrylonitrile graft polymer and cellulose-styrenesulfonic acid graft polymer, natural substances, such as hyaluronic acid, agarose, chitosan and collagen, and synthetic polymers, such as crosslinked PVA, PVA elastomer, crosslinked acrylic acid salt polymer, partial hydrolysate of acrylic ester-vinyl acetate copolymer, acrylic acid salt-PVA copolymer, partial hydrolysate of polyacrylonitrile, hydroxyethyl methacrylate polymer, salt of maleic anhydride-isobutylene copolymer, polymer and copolymer of vinylpyrrolidone, polyethylene glycol diacrylate copolymer, polypropylene glycol diacrylate copolymer and polyethyleneimine copolymer, which may be used alone or as a mixture of two or more of them.

Hereinafter such a substance is referred to as "the hydrophilic substance".

In the addition of the hydrophilic substance to the thermoplastic resin, if necessary, a compatibilizing agent may be used as an auxiliary. The compatibilizing agent may be an ordinary one for polymer alloys or any substance which is compatible with both the hydrophilic substance and the thermoplastic resin, is hydrophilic in itself and exhibits both hydrophilicity and lipophilicity, for example, polyvinyl ether, polyvinyl ketone or lecithin. The compatibilizing agent may be used in a state copolymerized with the above hydrophilic substance.

Further, a graft polymer prepared by reacting a commercially available compatibilizing agent as a macromonomer with a hydrophilic substance may be added to the thermoplastic resin. It is preferable in this case that the macromonomer be one having polar hydroxyl or carboxyl groups at its ends.

Furthermore, a reactive compatibilizing agent comprising a hydrophilic urethane, an aliphatic amine and a mono- or diglycidyl ether can be used favorably.

Although the incorporation of the hydrophilic substance into the thermoplastic resin can be conducted under heating at a temperature above the softening point of the resin by the use of rolls or a kneader, the compatibility of the resin differs from resin to resin. In particular, some of the resins having much different SP values are difficult to compatibilize with each other. The compatibilization of the hydrophilic substance and the thermoplastic resin in each other is an object of the present invention and is substantially different from the macroscopic compatibilization of resins in each other utilizing a graft polymer, and compatibilization of different thermoplastic resins is nothing but a concomitant result.

The plastic cement composition of the present invention is prepared by compatibilizing the thermoplastic resin with the hydrophilic substance and kneading the obtained mixture together with the cement component.

The formulation for preparing the plastic cement composition varies depending upon the kinds of the thermoplastic resin and the hydrophilic substance. Generally, 0.1 to 20 parts by weight of a hydrophilic substance and 50 to 600 parts by weight of a cement component are used per 100 parts by weight of a thermoplastic resin. The ratio of the thermoplastic resin to the cement component varies depending upon the maximum oil absorption of the cement component. Generally, the lower the viscosity of the thermoplastic resin, the larger the amount of the cement component added.

When a soft cement composition is desired, the formulation therefor preferably comprises 100 parts by weight of a thermoplastic resin, 0.1 to 3 parts by weight of a hydrophilic substance and 50 to 300 parts by weight of a cement component. The resulting composition contains the resin in a relatively large amount and the product of hardening thereof retains the properties of the thermoplastic resin.

When a hard cement composition is desired, the formulation therefor preferably comprises 100 parts by weight of a thermoplastic resin, 3 to 10 parts by weight of a hydrophilic substance and 300 to 600 parts by weight of a cement component. The resulting composition contains the resin in a relatively small amount and the product of hardening thereof loses the properties of the resin.

In the invention, in addition to cements, here is a method for treating the surface of cements with aggregates and various fibers as reinforcement used for portland cement, cement-dispersants and a cement-absorbing assistant such as a polyhydric alcohol like, ethylene glycol, propylene glycol, glycerin and butanediol, for facilitating the water absorption of the cement component. Further, in order to control the hydration time of a molded article of the composition, a ketone such as methyl isobutyl ketone, methyl isobutyl carbinol, acetylacetone or acetoacetic acid may be added, by which the hydration of the cement component is retarded until the completion of evaporation of the ketone to prevent the aeration of the cement component. Thus, the pretreatment of the cement component is effective in the surface wettability of the cement component with the thermoplastic resin and serves to improve the properties of the plastic cement composition.

Of course, the cement component may be surface-treated with the above hydrophilic substance.

In preparing a polymer alloy or polymer blend comprising a thermoplastic resin and a hydrophilic substance, the ratio of the substance to the resin varies depending mainly upon the chemical composition of the resin. It is preferable to use a hydrophilic substance which can exhibit an enough effect in an amount smaller than that of the thermoplastic resin. For example, polyethylene oxide can impart hydrophilicity to a polyolefin such as PE or PP, when added even in an amount of 1 to 3% by weight, while it can impart it to nylon 6 or nylon 66, when added even in an amount of 0.1 to 0.3% by weight.

Polyethylene oxide, which this way has an excellent compatibility and an excellent effect of imparting hydrophilicity, but is generally hardly effective for synthetic rubbers, is suitable in a method for making a copolymer thereof with an PVA elastomer, vinylpyrrolidone or polyvinyl ether in the thermoplastic resin. For example, a slurry prepared by mixing a powdery salt of maleic anhydride-isobutylene copolymer with dioctyl phthalate (DOP) is kneaded together with PVC in the presence of a monoepoxy resin as a crosslinking agent under heating to effect compatibilization of the PVC and the powdery salt in each other. A highly hydrophobic thermoplastic resin such as PET or PBT can be improved in hydrophilicity by the use of polyacrylamide as a water-absorbing resin and an epoxy-modified polystyrene graft polymer as a compatibilizing agent. Further, an acrylate salt-PVA copolymer as a highly water-absorbing polymer is very compatible with a soft resin such as PVC, urethane elastomer, polyester elastomer, polyamide elastomer, polybutadiene elastomer, or vinyl chloride elastomer. The above-mentioned constituents of the thermoplastic cement composition are mixed with each other with rolls or a kneader under heating and thermoplastically molded by, for example, press molding or injection molding through extrusion or calendaring.

In this step, if necessary, a plasticizer, softening agent and/or stabilizer may be added to impart softness and weathering resistance to the thermoplastic cement composition.

The plastic cement composition thus prepared may be immediately annealed to harden the cement component contained therein or may be kept thermoplastic and hardened at service.

The hardening by annealing can make the plastic cement composition harden at a predetermined temperature in a predetermined time, so that it can be easily controlled to be suitable for the production of articles requiring high quality. On the other hand, the precess of hardening the composition at service is advantageous in that the composition can be handled in a state rich in softness and plasticity, though the hardening is conducted in situ to result in difficult control.

Accordingly, the kind of the thermoplastic resin to be used and the amount of the cement component to be used must be determined depending upon the use of an objective article to prepare a thermoplastic cement composition having desired properties.

According to the present invention, plastic cement compositions having various properties can be prepared, so that a suitable composition for the production of an objective article must be selected from among them depending upon the use of the article by taking into account the properties of the thermoplastic resin contained therein as the main component. That is, the unhardened thermoplastic cement composition according to the present invention includes rubbery, asphaltic and thermoplastic ones. Further, a product of gradient function in which the surface of the product is hardened with the inside thereof being unhardened can be prepared by controlling the extent of the hardening. In particular, the air-hardening plastic cement composition is hardened with water and air and therefore tends to form a product in which the hardening of the surface proceeds to an extent higher than that of the inside.

Of course, it is needless to say that the rate of hardening of the plastic cement composition and the properties of the product of hardening thereof vary depending upon the amount of the hydrophilic substance and the extent of modification of the thermoplastic resin.

The thermoplastic cement composition of the present invention can be molded by any means utilizing thermoplasticity. Further, when the composition is hard, it can also be molded by compression molding with a hot press wherein the thermoplastic resin acts as a binder for the cement component. Accordingly, the composition can be molded by a process suitable for the objective article.

The first step of the preparation of the thermoplastic cement composition is the preparation of a polymer alloy or polymer blend comprising a thermoplastic resin and a hydrophilic substance. When the thermoplastic resin and the hydrophilic substance are compatible with each other, both of them can be directly kneaded under heating to give a polymer blend, while when they are incompatible with each other, both of them must be dissolved in each other by the technique of polymer alloys.

Among the above thermoplastic resins, those which are relatively compatible with the hydrophilic substance can be treated by the above polymer blend technique. More precisely, a hydrophilic substance is added to a thermoplastic resin under heating at a temperature near the melting point of the resin and the obtained mixture is kneaded to conduct homogeneous incorporation. When the direct incorporation of the hydrophilic substance into the thermoplastic resin is difficult, the hydrophilic substance may be added to the thermoplastic resin simultaneously with the cement component or may be preliminarily added to the cement component. Further, the hydrophilic substance may be preliminarily added to a filler or an aggregate.

Alternatively, indirect blending may be employed in blending a hydrophilic substance with a thermoplastic resin which is difficultly blendable therewith. The indirect blending is a means for blending a thermoplastic resin with a hydrophilic substance through another thermoplastic resin which is compatible with both of the thermoplastic resin and the hydrophilic substance.

This means is particularly advantageous for cement-rich formulations and for cases wherein the thermoplastic resin and hydrophilic substance to be blended are much different from each other in SP value. The cement composition prepared by this means has an increased melt index and therefore is difficult to mold by injection, so that it is suitable for compression molding. The indirect blending is less expensive than the polymer alloy technique and suitable for the production of large molded articles. Further, in some cases, it is possible to arrange reinforcing bars and add aggregate.

The polymer alloy techniques include one which comprises mixing a hydrophilic substance with a compatibilizing agent and adding the obtained mixture to a thermoplastic resin and one which comprises adding a compatibilizing agent to a thermoplastic resin and adding a hydrophilic substance to the obtained mixture. Of these techniques, the former is frequently employed, because the amount of the hydrophilic substance used is relatively small, though the polymer alloy according to the present invention is different from an ordinary one comprising thermoplastic resins in this respect.

The compatibilization of the hydrophilic substance and the thermoplastic resin can be conducted by kneading with a dispersion mixer, heated rolls, extruder or the like. Further, the obtained mixture is suitably kneaded together with the cement component by the use of a Banbury mixer or pressure kneader. The kneading machine used in the case of using a rubbery thermoplastic resin is generally different from that used in the case of using an ordinary thermoplastic resin. Whether the preparation of the polymer alloy or polymer blend and the mixing thereof with the cement component are conducted with one machine or respective machines must be determined by taking into account the properties of the thermoplastic cement composition.

The thermoplastic cement composition thus prepared may be molded into a product either through pelletization or directly. Although the molding manner of the composition varies depending upon the use, the manners can be classified roughly into shop molding and field molding.

The thermoplastic cement composition can be molded into an article by a molding means selected from among injection, extrusion, calendaring, compression and other molding means depending upon the melt index of the composition. The thus-prepared thermoplastic cement composition according to the present invention exhibits unique properties which the thermoplastic resins of the prior art do not exhibit. More specifically, according to the present invention, a thermoplastic resin is converted into a flame-resistant plastic or a non-thermoplastic resin depending upon the cement content, in other words, the resin is not only converted into a heat-resistant plastic, but also is improved in compression strength, dimensional stability and weathering resistance, though the tensile strength and flexural strength are lowered. A thermoplastic rubber is converted into a product similar to that after vulcanization thereof and the state of the product varies from an elastomer to a rigid body with an increase in the cement content.

The thermoplasticity of the article molded from the thermoplastic cement composition can be changed by treating the article with water to harden the cement component. The rate of hydration of the article varies depending upon the thickness of the article and the contents of the hydrophilic substance and the cement component. The thinner the article, the speedier the hydration, while the thicker, the slower. Further, the higher the hydration temperature, the speedier, while the lower, the slower. A composition containing a cement component having a higher setting rate tends to be hydrated more speedily.

The thus-prepared thermoplastic resin composition and molded article thereof according to the present invention can be used in various fields and examples thereof are as follows. Uses of asphaltic and low-melting thermoplastic cement composition:

rutting proof asphalt, color pavement, waterproof material, flooring material, and putty.

Uses of rubbery thermoplastic cement composition:

color pavement, waterproof material, flooring material, putty, facing material, sealant, and foam.

Uses of general-purpose thermoplastic cement composition:

heat-resistant plastic, flame-retardant plastic, and construction materials (permanent frame, precast concrete, sewerage materials, and road materials).

The thermoplastic cement composition of the present invention is characterized by losing the properties of a thermoplastic resin through the hydration of the cement contained therein and being converted into a heat-resistant resin cement. Accordingly, the present invention provides a new technique useful for improving the properties of plastics or for recycling waste plastics.

EXAMPLES

The present invention will now be described in more detail by referring to the following Examples, though the present invention is not limited by them.

In the Examples, all parts are by weight.

Example 1

3 parts of a polyethylene oxide (degree of polymerization: 20, a product of Meisei Kagaku) was added in portions to 100 parts of an ethylene-vinyl acetate copolymer (#450, a product of Tosoh Corp.) and kept at 140° C. by heating with heated rolls. After the completion of the addition, 200 parts of portland cement was added to the resulting mixture at that temperature. The obtained mixture was kneaded and molded into a plate having a thickness of 4 mm. As soon as this plate was immediately dipped in water, it turned white. The resulting plate was allowed to stand for 6 hours and examined for its properties. The plate had a tensile strength of 167 kg/cm$^2$ as determined according to ASTM D965 and an elongation at breaking of 8.2% as determined according to ASTM D638. Before dipping, the ethylene-vinyl acetate cement composition of this Example had a softening point of 91° C., while after dipping, the composition lost its thermoplasticity to fall in softening.

Comparative Example 1

200 parts of portland cement was added to 100 parts of an ethylene-vinyl acetate copolymer (#450, a product of Tosoh Corp.) kept at 140° C. by heating with heated rolls. The obtained mixture was kneaded and dipped in water for 6 hours. The resulting product had a softening point of 93° C., which means that the cement component failed in hydration.

Example 2

10 parts of an MEK oxime-blocked hydrophilic urethane prepolymer was added in portions to 100 parts of an ABS resin (Diaper, a product of Mitsubishi Rayon Co., Ltd.) and kept at 135° C. by heating with heated rolls, while kneading the resulting mixture. After the completion of the addition, 200 parts of white portland cement was added to the obtained mixture at that temperature. The resulting mixture was kneaded again and molded into a plate with rolls set at such a nip as to give a thickness of 4 mm. As soon as plate was immediately dipped in water, it turned white. The resulting plate was allowed to stand for 12 hours and examined for the properties. The resulting plate had a tensile strength of 174 kg/cm$^2$ (ASTM D965) and an elongation at breaking of 6.4% (ASTM D638). Before dipping, the ABS resin cement composition of this Example had a softening point of 102° C., while after dipping, the composition lost its thermoplasticity to fail in softening.

Comparative Example 2

200 parts of white portland cement was added to 100 parts of an ABS resin (Diaper, a product of Mitsubishi Rayon Co., Ltd.) and kept at 135° C. by heating with heated rolls. The obtained mixture was kneaded and molded into a plate with rolls set at such a nip as to give a thickness of 4 mm. immediately thereafter, the plate was dipped in water and allowed to stand for 12 hours. The resulting plate had a softening point of 102° C., which means that the cement component failed in hydration.

Example 3

A mixture comprising 5 parts of a polyethylene oxide (degree of polymerization: 20, a product of Meisei Kagaku) and 5 parts of methyl vinyl ketone was added in portions to 100 parts of a polystyrene (a product of Denki Kagaku Kogyo K. K.) and kept at 135° C. by heating with heated rolls. After the completion of the addition, 150 parts of white portland cement was added to the obtained mixture at that temperature. The resulting mixture was kneaded and molded into a plate with rolls set at such a nip as to give a thickness of 4 mm. As soon as the plate was dipped in water, it turned white. The resulting plate was allowed to stand for 12 hours and examined for the properties. The plate had a tensile strength of 321 kg/cm$^2$ (ASTM D965) and an elongation at break of 0.4% (ASTM D638). Before dipping, the polystyrene cement composition of this Example had a softening point of 111° C., while after dipping, the composition lost its thermoplasticity to fail in softening.

Comparative Example 3

150 parts of white portland cement was added to 100 parts of a polystyrene (a product of Denki Kagaku Kogyo K. K.) kept at 135° C. by heating with heated rolls, followed by kneading. The obtained mixture was molded into a plate with rolls set at such a nip as to give a thickness of 4 mm. The plate was dipped in water and allowed to stand for 12 hours. The resulting plate had a softening point of 112° C., which means that the cement component failed in hydration, unlike Example 3.

Example 4

A premix comprising 5 parts of a polyethylene oxide (degree of polymerization: 20, a product of Meisei Kagaku) and 5 parts of PVA was added to 100 parts of a low-density polyethylene (a product of Mitsui Petrochemical Industries, Ltd.) and kept at 140° C. by heating with heated rolls, followed by the addition of 400 parts of portland cement. The resulting mixture was kneaded and molded into a plate with rolls set at such a nip as to give a thickness of 4 mm. The plate was dipped in water and allowed to stand for 12 hours. The resulting plate had a tensile strength of 122 kg/cm$^2$ (ASTM D965) and an elongation at breaking of 2.6% (ASTM 3638). Before dipping, the polyethylene resin cement composition of this Example had a softening point of 97° C., while after dipping, the composition lost its thermoplasticity to fail in softening.

Comparative Example 4

400 parts of portland cement was added to a low-density polyethylene (a product of Mitsui Petrochemical Industries, Ltd.) and kept at 140° C. by heating with heated rolls, followed by kneading. The obtained mixture was molded into a plate with rolls set at such a nip as to give a thickness of 4 mm. The plate was dipped in water and allowed to stand for 24 hours. The resulting plate had a softening point of 98° C., which means that the cement component failed in hydration unlike in Example 4.

Example 5

A premix comprising 5 parts of polypropylene oxide and 5 parts of a polyethylene-propylene block copolymer was added to 100 parts of a low-density polyethylene (a product of Mitsui Petrochemical Industries, Ltd.) and kept at 140° C. by heating with heated rolls, followed by the addition of 400 parts of portland cement. The obtained mixture was kneaded and molded into a plate with rolls set at such a nip as to give a thickness of 4 mm. This plate was dipped in water and allowed to stand for 24 hours. The resulting plate had a tensile strength of 111 kg/cm$^2$ (ASTM D965) and an elongation at breaking of 1.3 (ASTM D638). Before dipping, the polyethylene resin cement composition of this Example had a softening point of 87° C., while after dipping, the composition lost its thermoplasticity to fail in softening.

Example 6

A premix comprising 5 parts of polypropylene oxide and 5 parts of a polyethylene/propylene block copolymer was added to 100 parts of a polypropylene (a product of Mitsui Petrochemical Industries, Ltd.) and kept at 180° C. by heating with heated rolls, followed by the addition of 300 parts of portland cement. The obtained mixture was kneaded and molded into a plate with rolls set at such a nip as to give a thickness of 4 mm. The plate was dipped in water and allowed to stand for 24 hours. The resulting plate had a tensile strength of 323 kg/cm$^2$ (ASTM D965) and an elongation at break of 2.6% (ASTM D638). Before dipping, the polypropylene resin cement composition of this Example had a softening point of 187° C., while after dipping, the composition lost its thermoplasticity to fail in softening.

Example 7

A polymer blend prepared by kneading 10 parts of a phenol-blocked hydrophilic urethane prepolymer and 10 parts of NBR was added in portions to 100 parts of rigid polyvinyl chloride and kept at 140° C. by heating with heated rolls, followed by kneading. The obtained mixture was further kneaded together with 300 parts of portland cement to prepare a rigid polyvinyl chloride cement composition. This composition was molded into a plate with rolls set at such a nip as to give a thickness of 4 mm. The plate was dipped in water, allowed to stand for 12 hours, and examined for its properties. The plate had a tensile strength of 307 kg/cm$^2$ (ASTM D965) and an elongation at breaking of 0.3% (ASTM D638). Before dipping, the rigid polyvinyl chloride resin composition of this Example had a softening point of 81° C., while after dipping, the composition lost its thermoplasticity to fail in softening.

Example 8

A polymer blend prepared by kneading 10 parts of a phenol-blocked hydrophilic urethane prepolymer and 10 parts of NBR was added to 100 parts of flexible polyvinyl chloride and kept at 130° C. by heating with heated rolls, followed by kneading. The obtained mixture was further kneaded together with 300 parts of portland cement to prepare a rigid vinyl chloride cement composition. This composition was molded into a plate with rolls set at such a nip as to give a thickness of 4 mm. The plate was dipped in water, allowed to stand for 12 hours, and examined for the properties. The plate had a tensile strength of 103 kg/cm$^2$ (ASTM D965) and an elongation at break of 4.8% (ASTM D638). Before dipping, the flexible polyvinyl chloride cement composition of this Example had a softening point of 65° C., while after dipping, the composition lost its thermoplasticity to fail in softening.

Example 9

A polymer blend prepared by kneading 7 parts of PEO and 7 parts of EVA (vinyl acetate content: 60%) was added to 100 parts of a flexible polyvinyl chloride and kept at 140° C. by heating with heated rolls, followed by kneading. The obtained mixture was further kneaded together with 300 parts of portland cement to prepare a rigid polyvinyl chloride cement composition. This composition was molded into a plate with rolls set at such a nip as to give a thickness of 4 mm. The plate was dipped in water, and allowed to stand for 12 hours. The resulting plate had a tensile strength of 351 kg/cm$^2$ (ASTM D965) and an elongation at breaking of 0.8% (ASTM D638).

Example 10

A mixture comprising 1 part of RESEDA-GP-100 (acid modified acrylic-PMMA, a product of Toagosei) and 2 parts of polyethylene oxide was added in portions to 100 parts of nylon 6 and kept at 230° C. by heating with heated rolls, followed by homogeneous kneading. The obtained mixture was further kneaded together with 50 parts of Ready-Soak (magnesium phosphate cement). The obtained mixture was molded into a plate with rolls set at such a nip as to give a thickness of 4 mm. The plate was dipped in water and allowed to stand for 12 hours. The resulting plate had a tensile strength of 703 kg/cm$^2$ (ASTM D965) and an elongation at breaking of 540% (ASTM D638). Before dipping, the nylon 6 resin cement composition of this Example had a softening point of 68° C., while after dipping, the composition lost its thermoplasticity to fall in softening.

Example 11

A mixture comprising 2 parts of RESEDA-GP-500 (epoxy-modified polystyrene/polystyrene, a product of Toagosei) and 4 parts of polyethylene oxide was added in portions to 100 parts of PET and kept at 140° C. by heating with heated rolls, followed by homogeneous kneading. The obtained mixture was further kneaded together with 300 parts of portland cement to prepare a PET cement composition. This composition was molded into a plate with rolls set at such a nip as to give a thickness of 4 mm. The plate was dipped in water and allowed to stand for 12 hours. The resulting plate had a tensile strength of 643 kg/cm$^2$ (ASTM D965) and an elongation at breaking of 3.4% (ASTM D638). Before dipping, the PET cement composition of this Example had a softening point of 135° C., while after dipping, the composition lost its thermoplasticity to fail in softening.

Example 12

5 parts of a polyethylene oxide (degree of polymerization: 30, a product of Meisei Kagaku) was added in portions to 100 parts of asphalt and kept at 80° C. by heating with heated rolls. The obtained mixture was kneaded together with 150 parts of portland cement. 500 parts of No. 6 crushed stone, 300 parts of No. 7 crushed stone and 60 parts of fine sand were mixed with the mixture prepared above in a kneader. The obtained composition was subjected to the marshall stability test. It had the number of compaction runs of 75, a percentage void of 5.7, a void filled with bitumen of 84%, and a stability of 996. During the above test, the asphalt cement composition of this Example was lowered in thermoplasticity by water curing through the hydration of the cement component and the resulting hardened composition could not revert to a thermoplastic one, even by heating.

Comparative Example 5

500 parts of No. 6 crushed stone, 300 parts of No. 7 crushed stone, 60 parts of fine sand and 150 parts of stone powder were mixed with 100 parts of asphalt and kept at 80° C. by heating in a kneader. The obtained mixture was subjected to the marshall stability test. It had the number of compaction runs of 75, a percentage void of 5.6, a void filled with bitumen of 82, and a stability of 533. The composition of this Example was not changed in thermoplasticity by the test, so that the resulting composition could be molded by reheating.

Example 13

A mixture comprising 5 parts of an MEK oxime-blocked hydrophilic urethane prepolymer and 5 parts of polyethylene oxide was added in portions to 100 parts of an ethylene-vinyl acetate copolymer (#150, a product of Tosoh Corp.) and kept at 140° C. by heating with heated rolls, followed by the addition of 30 parts of polybutene. The obtained mixture was kneaded, followed by the addition of 300 parts of portland cement. The resulting mixture was kneaded and cured in water for 24 hours. The product of the curing had a tensile strength of 67 kg/cm$^2$ (ASTM D1238-57T) and an elongation at breaking of 28% (ASTM DSS2-56T). Before dipping, the ethylene-vinyl acetate resin cement composition of this Example had a softening point of 54° C., while after dipping, the composition lost its thermoplasticity to fail in softening. The cement composition of this Example had a low softening point, so that it can be molded in situ at a temperature near 60° C.

Comparative Example 6

200 parts of portland cement was added to 100 parts of an ethylene-vinyl acetate copolymer (#150, a product of Tosoh Corp.) and kept at 140° C. by heating with heated rolls, followed by kneading. The obtained mixture was dipped in water for 24 hours. The resulting mixture had a softening point of 53° C., which means that the cement component failed in hydration.

Example 14

10 parts of a PVA elastomer was added in portions to 100 parts of SBR and kept at 80° C. by heating with heated rolls, followed by the addition of 20 parts of polybutene. The obtained mixture was kneaded, followed by the addition of 300 parts of slaked lime. The obtained mixture was kneaded and cured in water For 24 hours and then in air having a humidity of 50% for 28 days. Before curing, the composition of this Example had a tensile strength of 33 kg/cm$^2$ (ASTM D412), while after curing, the composition had a tensile strength of 89 kg/cm$^2$ (ASTM D412). Before curing, the composition had a softening point of 54° C., while thereafter, it lost its thermoplasticity to fail in softening.

Comparative Example 7

The same procedure as that of Example 14 was repeated except that no PVA elastomer was added. The resulting composition softened at 54° C., even after curing, which means that the slaked lime failed in carbonation.

Example 15

A high-viscosity liquid prepared by adding 5 parts of a hydrophilic urethane prepolymer to an adduct of 0.5 part of DATA with 0.5 part of polypropylene carbonate and reacting the obtained mixture with sorbitol polyglycidyl ether was added to 100 parts of a chloroprene rubber and kept at 80° C. by heating with heated rolls, followed by kneading. 50 parts of silica flour and 50 parts of slaked lime were added to the mixture prepared above, followed by kneading. The obtained chloroprene cement composition was cured in water for 24 hours. The product of the curing had the properties equivalent to those of the product of vulcanization.

The hardness of the rubber before water curing 28
The hardness of the rubber after water curing 64

Example 16

3 parts of an N,N'-methylenebisacrylamide copolymer was added to 100 parts of a styrene block copolymer and kept at 90° C. by heating with heated rolls, followed by the addition of 50 parts of carbon black and 100 parts of alumina cement. The obtained mixture was kneaded.

When the styrene block copolymer-alumina cement composition thus prepared was cured in water for 24 hours, the cement component hardened.

The hardness of the rubber before water curing 37.
The hardness of the rubber after water curing 62.

Example 17

100 parts of polyphenylene sulfide and a premix comprising 3 parts of an epoxy resin (P-4100, a product of Asahi Denka Kogyo K. K.), 3 parts of EVA (#150 a product of Tosoh Corp.) and 5 parts of PEO were blended and extruded with an extruder at 290° C. into pellets. These pellets were mixed with 100 parts of alumina cement on a double-arm kneader at 280° C. to give a polyphenylene sulfide-alumina cement composition. This composition was compression-molded and the obtained molded article was cured in water for one week. The resulting article did not deform, even at 350° C., while the thermal deformation temperature of the article before water curing was 268° C., which reveals that the composition of this Example was remarkably improved in heat resistance by curing.

I claim:

1. A process for producing a thermoplastic cement composition comprising the steps of: melting 100 parts by weight of a thermoplastic polymer; blending the molten thermoplastic polymer with 0.1 to 20 parts by weight of a hydrophilic substance selected from the group consisting of a polyolefin oxide, a polyhydric alcohol, a nonionic surfactant, a starch-acrylonitrile graft polymer, a starch-acrylic acid graft polymer, a starch-styrene sulfonic acid graft polymer, a starch-vinylsulfonic acid graft polymer, a starch-acrylamide graft polymer, a starch-polyvinyl ketone graft polymer, a cellulose-styrene sulfonic acid graft polymer, hyaluronic acid, agarose, chitosan, collagen, crosslinked PVA, a PVA elastomer, a crosslinked acrylic acid salt polymer, a partial hydrolysate of an acrylic ester-vinyl acetate copolymer, an acrylic acid salt-PVA copolymer, a partial hydrolysate of polyacrylonitrile, a hydroxyethyl methacrylate polymer, a salt of a maleic anhydride-isobutylene copolymer, a vinylpyrrolidone polymer, a vinylpyrrolidone copolymer, a polyethylene glycol diacrylate copolymer, a polyethyleneimine copolymer, and mixtures thereof, to render the molten thermoplastic polymer and the hydrophilic substance compatible with each other and form a polymer alloy; and mixing the polymer alloy with 50 to 600 parts by weight of at least one of a hydraulic cement selected from the group consisting of a portland cement, a Hauyen cement, an alumina cement, a dental cement, an oxychloride cement, an acid-proof cement, a gypsum cement, a mixture of activated silica and calcium hydroxide and a mixture of activated alumina and calcium hydroxide, or an air-hardening cement selected from the group consisting of lime cement, magnesia cement, calcium hydroxide cement, dolomite plaster, and powdered metal cement, to produce the thermoplastic cement composition.

2. A process for producing a thermoplastic cement composition consisting essentially of the steps of: melting 100 parts by weight of a thermoplastic polymer; blending the molten thermoplastic polymer with 0.1 to 20 parts by weight of a hydrophilic substance selected from the group consisting of a polyolefin oxide, a polyhydric alcohol, a nonionic surfactant, a starch-acrylonitrile graft polymer, a starch-acrylic acid graft polymer, a starch-styrene sulfonic acid graft polymer, a starch-vinylsulfonic acid graft polymer, a starch-acrylamide graft polymer, a starch-polyvinyl ketone graft polymer, a cellulose-styrene sulfonic acid graft polymer, hyaluronic acid, agarose, chitosan, collagen, crosslinked PVA, a PVA elastomer, a crosslinked acrylic acid salt polymer, a partial hydrolysate of an acrylic ester-vinyl acetate copolymer, an acrylic acid salt-PVA copolymer, a partial hydrolysate of polyacrylonitrile, a hydroxyethyl methacrylate polymer, a salt of a maleic anhydride-isobutylene copolymer, a vinylpyrrolidone polymer, a vinylpyrrolidone copolymer, a polyethylene glycol diacrylate copolymer, a polyethyleneimine copolymer, and mixtures thereof, to render the molten thermoplastic polymer and the hydrophilic substance compatible with each other and form a polymer alloy; and mixing the polymer alloy with 50 to 600 parts by weight of at least one of a hydraulic cement selected from the group consisting of a portland cement, a Hauyen cement, an alumina cement, a dental cement, an oxychloride cement, an acid-proof cement, a gypsum cement, a mixture of activated silica and calcium hydroxide and a mixture of activated alumina and calcium hydroxide, or an air-hardening cement selected from the group consisting of lime cement, magnesia cement, calcium hydroxide cement, dolomite plaster, and powdered metal cement, to produce the thermoplastic cement composition.

3. The process of claim 1, wherein said hydraulic cement is selected from the group consisting of portland cement and an alumina cement and said air-hardening cement is lime cement.

4. The process of claim 1, wherein water is added to the thermoplastic cement composition to effect the curing thereof.

5. The process of claim 1, wherein the thermoplastic cement composition is cured by being annealed.

6. The process of claim 1, wherein a compatibilizing agent selected from the group consisting of polyvinyl ether, polyvinyl ketone and lecithin is added to aid in the blending of the molten thermoplastic polymer with the hydrophilic substance.

7. The process of claim 1, wherein from 300 to 600 parts by weight of cement is mixed with the polymer alloy.

8. The process of claim 1, wherein 0.1 to 3 parts by weight of the hydrophilic substance and 50 to 300 parts by weight of cement are used.

9. The process of claim 1, wherein 3 to 10 parts by weight of the hydrophilic substance and 300 to 600 parts by weight of cement are used.

* * * * *